United States Patent [19]

Muscatell

[11] Patent Number: 4,686,858
[45] Date of Patent: Aug. 18, 1987

[54] FLIGHT INSTRUMENT USING LIGHT INTERFERENCE FOR ACCELERATION SENSING

[76] Inventor: Ralph P. Muscatell, 2007 N.E. 20th Ave., Ft. Lauderdale, Fla. 33305

[21] Appl. No.: 878,364

[22] Filed: Jun. 25, 1986

Related U.S. Application Data

[62] Division of Ser. No. 725,226, Apr. 19, 1985.

[51] Int. Cl.$^4$ ............................................. G01P 15/13
[52] U.S. Cl. ................................... 73/517 B; 356/345
[58] Field of Search ................. 73/517 B, 517 R, 653, 73/862.61; 356/345

[56] References Cited

FOREIGN PATENT DOCUMENTS 2370284 7/1978 France ............................. 73/517 R
111430 9/1981 Japan ................................... 73/653

Primary Examiner—John Chapman
Attorney, Agent, or Firm—Oltman and Flynn

[57] ABSTRACT

Aircraft instrument for indicating accelerations of the aircraft movement based on the use of an optical laser interferometer. A mass is connected to one of several mirrors in the interferometer which causes the interference pattern to move up or down in response to the change in acceleration. The interferometer uses a laser beam projected onto on optical detector that senses the motion of the interference pattern and produces a corresponding electrical signal which is connected to a linear motor which in turn is linked to the same mirror but in a negative feed-back arrangement that seeks to restore the position of the interference pattern. The amplifier output is an electrical analog of the acceleration.

5 Claims, 17 Drawing Figures

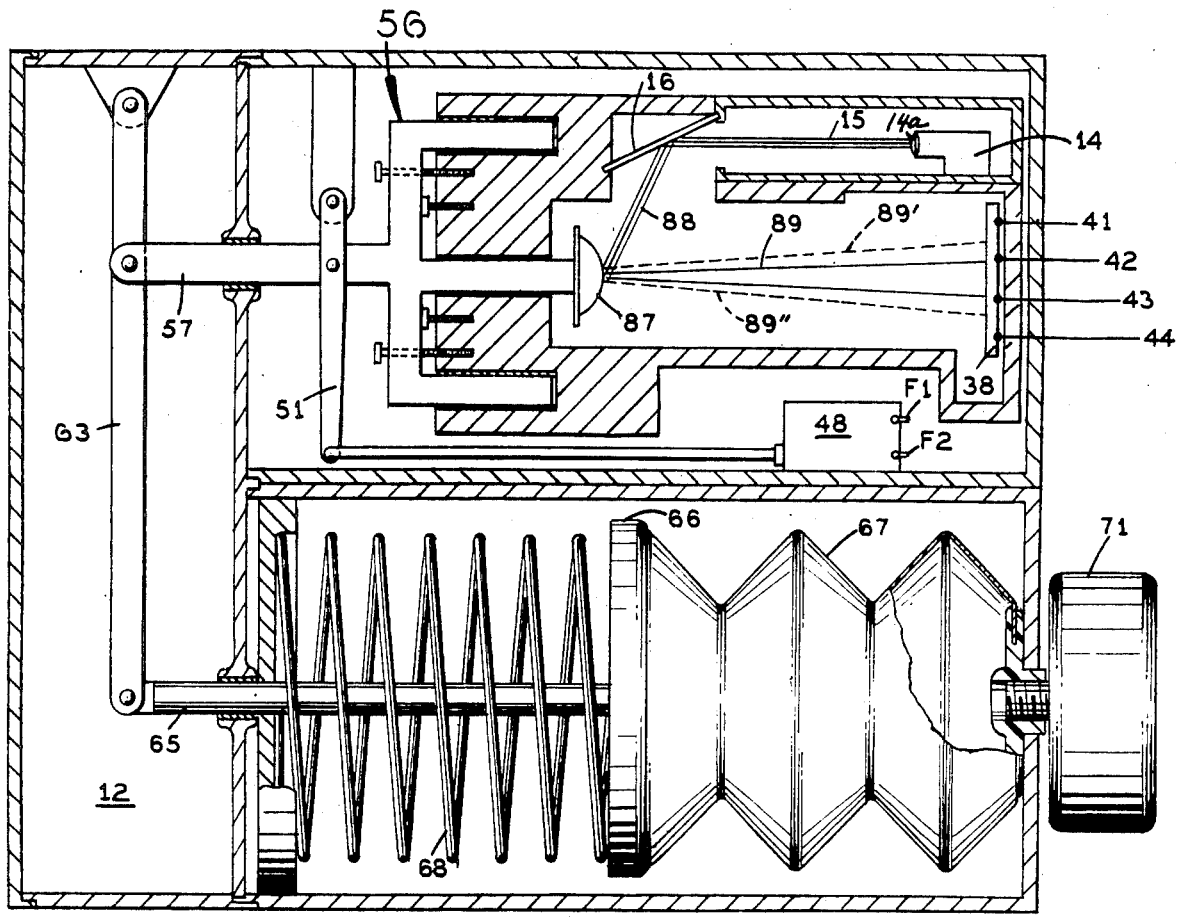
FIG.2
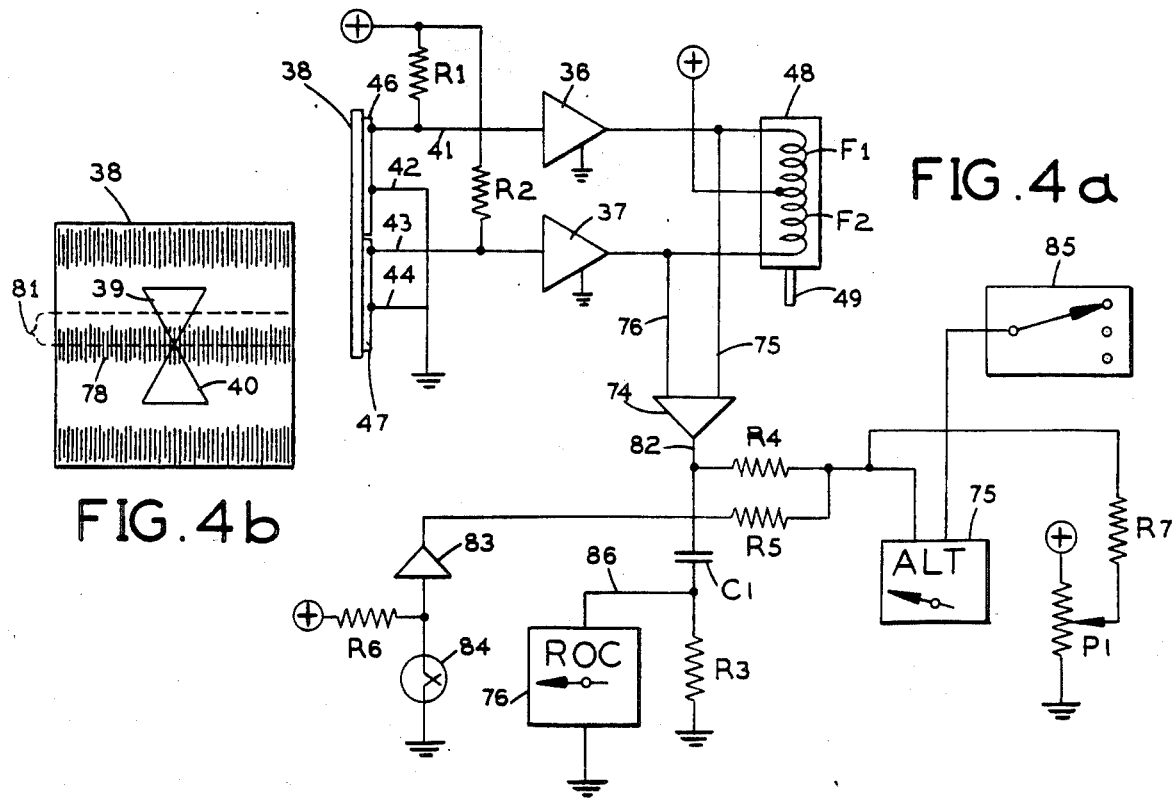
FIG.4a
FIG.4b

FLIGHT INSTRUMENT USING LIGHT INTERFERENCE FOR ACCELERATION SENSING

This application is a division of application Ser. No. 725,226, filed 4-19-85.

BACKGROUND AND PRIOR ART

This invention relates to flight instruments and more particularly to flight instruments based on light interference phenomena for sensing acceleration forces.

There are, in most aircraft, a group of flight instruments that are based on the principle of detecting pressure changes, especially the atmospheric air pressure. The instruments are: (a) the airspeed indicator which senses the difference between the air pressure on the inlet of a pitot tube placed at the front of the aircraft and the reference pressure at some pressure-neutral point of the aircraft fuselage, and (b): the altimeter which measures the aircraft altitude as a function of the barometric pressure at the altitude of the aircraft and (c): the rate-of-climb indicator which measures the rate-of-climb or descent of the aircraft by measuring the difference between the air pressure in a plenum containing a volume of air and connected through a restriction to the point of reference pressure and the unrestricted reference air pressure. In other words, the rate-of-climb indicator performs a differentiation of the air pressure as a function of the aircraft's changing altitude.

The three instruments listed hereinabove all contain an air pressure sensing device which is typically a diaphragm exposed on one or both sides to the air pressure to be measured. The diaphragm is, in conventional flight instruments, connected through a sensitive mechanical linkage to a rotating pointer in front of a dial which displays the visual indication provided by the instrument, such as air speed in nautical miles per hour, altitude in feet and thousands of feet and rate-of-climb in feet per second.

Another flight instrument which depends on sensing of pressures is the accelerometer, which is part of the inertial guidance system used in some large aircraft for navigation. The accelerometer senses the pressure changes as a force exerted on a mass in the accelerometer as the aircraft undergoes changes in velocity. This force is usually sensed by means of suitable electronic sensors that are part of the accelerometer.

The instant application discloses methods for the use of light interference phenomena, which are created by a beam of coherent monochromatic light, for sensing of pressures in flight instruments with a high degree of precision.

Flight instruments of conventional construction based on bellows action or mechanical linkages are subject to corrosion, mechanical wear and intrusion of dust which all contribute to loss of dependability and accuracy.

PRIOR ART

Inventors have in the past sought ways to produce pressure transducers that are highly dependable and avoid the use of complex mechanical linkages.

U.S. Pat. No. 4,160,600 discloses a pressure responsive apparatus using interference rings for reading the deflection of a diaphragm exposed to pressure.

U.S. Pat. No. 3,842,353 discloses a photoelectric transducer which detects optically the position of a diaphragm and translates the position into an electric signal with a feedback circuit for balance.

U.S. Pat. No. 3,590,640 discloses a halographic pressure sensor having a flexible diaphragm exposed on one side to pressure to be measured and on the other side to a light beam which is reflected and halographically reconstructed.

U.S. Pat. No. 3,387,494 discloses a tensioned membrane for use in pressure sensing apparatus. The membrane has a unique construction providing high stability.

U.S. Pat. No. 3,040,583 discloses an optical pressure transducer for sensing small transient pressures by means of a reflected light beam.

SUMMARY OF THE INVENTION

The invention is directed to a flight instrument which uses a beam of coherent monochromatic laser light which is reflected from a pressure responsive diaphragm exposed to the pressure differentials to be sensed and which is coupled to a light reflective element for reflecting the beam of light onto an electroptical target which translates an interference pattern, created by the reflected light, into electrical translation of the sensed pressure.

By the use of such a pressure sensing apparatus for a flight instrument, the drawbacks of mechanical linkage to a visual display can be eliminated and replaced by an all electronic solid-state display.

Furthermore, the translation of the pressure into electronic signals affords the advantage of an electrical connection between the pressure sensing apparatus and the visual display apparatus, thereby alleviating overcrowding of the space available on and behind the aircraft instrument panels.

Further still, the translations of the pressure into electronic signals affords the advantage that the signals can be electronically modified and translated for a better visual presentation to the pilot.

The instant specification also discloses an accelerometer for air navigation based on the same pressure sensing apparatus described hereinabove.

As part of the disclosed invention an embodiment is described which uses a negative feedback arrangement consisting of an electromechanical transducer coupled to the reflectory element which resists, by means of an opposing mechanical force, the deflection of the reflecting element. The transducer may be a linear motor traversed by a current produced by the opto-electronic circuit. The amplitude of the negative feedback current is a measure of the pressure exerted on the pressure responsive diaphragm.

Detection of pressure in the present invention is based on sensing the position and movement of lightwave interference fringes caused by the optical interference caused by pressure changes which cause deflection of the reflecting element.

Further objects and advantges of this invention will be apparent from the following detailed description of presently preferred embodiment which are illustrated schematically in the accompanying drawings.

BRIEF DESCRIPTION OF THE DRAWINGS

FIG. 2 is a cross-sectional view of an alternate version of the altimeter based on deflection of a light beam as differentiated from light interference detection showing details of the internal components, shown in FIG. 1, showing details of the internal components;

FIG. 4a, & 4b is a schematic circuit diagram of the electronic diagram, and the photo sensor.

DESCRIPTION OF THE PREFERRED EMBODIMENTS

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Figure 1:
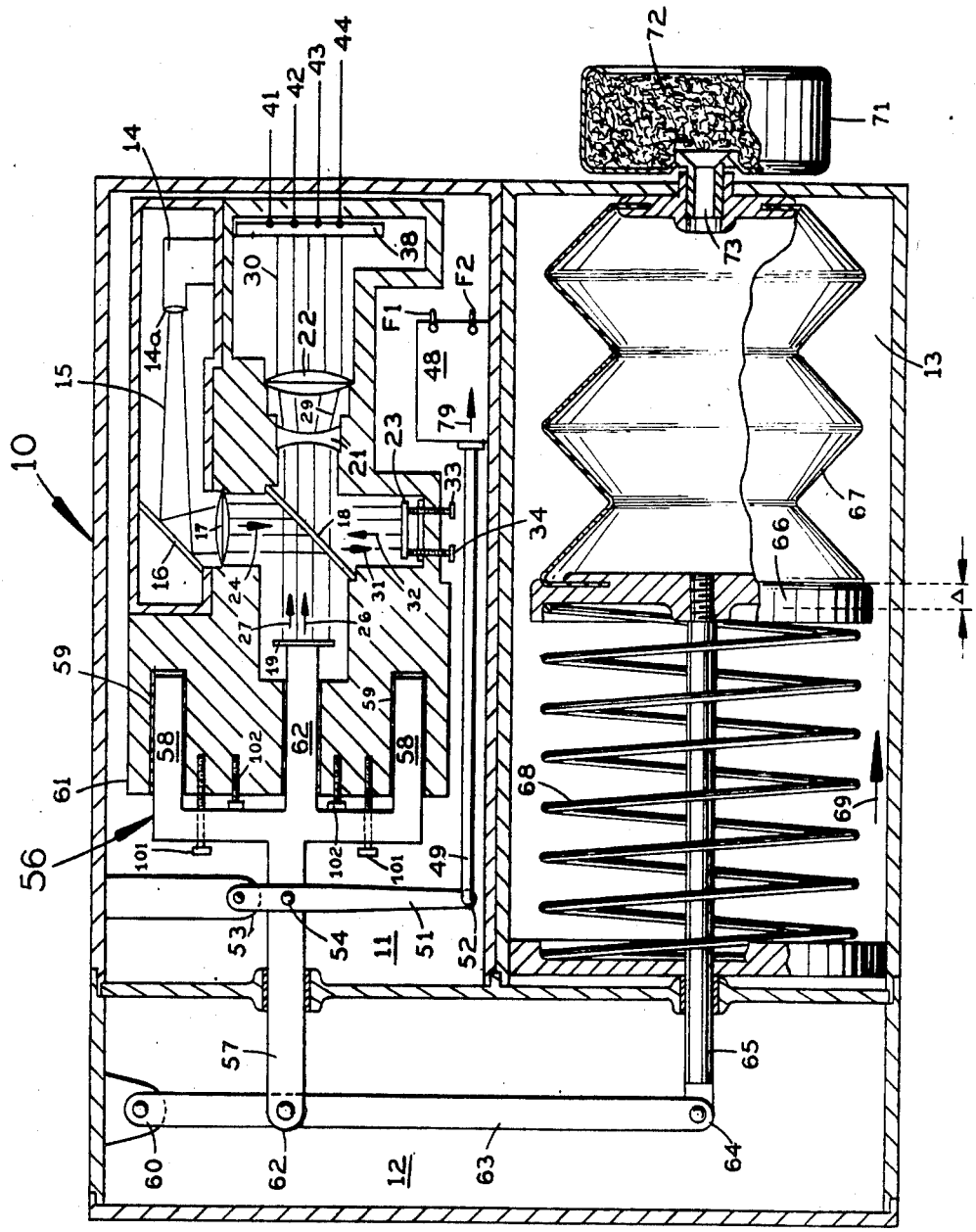
FIG. 1 is a perspective diagrammatic, part-cross-sectional view of an altimeter according to the teachings of the invention, showing a housing containing a pressure responsive light reflecting apparatus connected to a bellows communicating with the outside air pressure, a laser light source and an optoelectric sensor.

FIG. 1 is an embodiment of the invention configured as a flight altimeter, showing an instrument housing divided into three chambers, namely the laser chamber 11, a lever chamber 12 and a bellows chamber 13.

The laser chamber 11 contains a laser interferometer constructed generally along the lines of a Michelson interferometer, which is well known and described in detail in publications such as Cenco Instrument Corp., Selective Experiments in Physics, No. 71990-548 and others.

The interferometer generally at 10, consists of a laser light emitter 14 with a lens 14a projecting a first diverging beam 15 of laser light onto a first mirror 16 that is tilted such that the beam 15 is projected downward onto a convex lens 17 with such a curvature that the exiting light beam 24 emerging downward from the lens 17 consists of parallel rays. The downward projecting beam 24 meets a half-silvered tilted second mirror 18 that operates as a beam-splitting mirror, so that half of the incident beam 24 is reflected to the left onto a third mirror 19 as a partial beam of light 26. The partial beam is reflected back as the reflected partial beam 27 and travels through the half-silvered mirror 18 until it meets a concave lens 21, disposed at the right hand side of the mirror 18, and emerges from the lens 21 as a second diverging beam 29. The beam 29 meets a convex lens 22 that has such a curvature that a second parallel beam 30 is formed. The vertical parallel beam 24, described hereinabove, was divided by the half-silvered mirror 18, and part of the light of the beam 24 continues down through the half-silvered mirror 18 as a partial vertical beam 31, which is again reflected upward as a second partial reflected beam 32 by the horizontal adjustable mirror 23. The partial second reflected beam 32 impinges on the half silver reflective coating of the tilted mirror 18 and is reflected to the right and merges with the first reflected partial beam 27, and the two merged beams, having the same wavelength and almost identical length of travel path from the laser 14, therefore produce an interference pattern on the surface of the motion sensing photo detector 38.

If the length of travel of the two interfering beams 23 and 27 have a travel difference of exactly $\frac{1}{2}$ wavelength of the laser light, the interference pattern created on the photo detector 38 will be a dark circular pattern on the surface of the photodetector 38. This pattern can be changed, however, by an adjustment of the horizontal mirror 23, which for that purpose is supported by two micrometer screws 33 and 34 so that the mirror 23 can be adjusted to a pattern closer to or farther from the mirror 18 in the direction of the incident light beam 31 and it also can be adjusted to a small angle to the normal of the light beam 31.

As a result of the adjustment of the mirror 23, the interference pattern on the photo detector can be modified from a dark circular pattern to a series of adjustment, alternating dark and bright horizontal parallel interference lines across the surface of the photo detector 38.

If the two mirrors 19 and 23 are accurately perpendicular to each other, the interference fringes will consist of concentric circles. Moving to the mirror 23 about 50 mm from the center of the beam splitter, quite a large number of circular fringes will be seen on the photo sensor 38 and the fringes will be closely spaced. If mirror 23 is moved inward towards the beam splitter, gradually the fringe system will contract and fringes will disappear one at a time at the center of the pattern. As the mirror 23 passes through the position of path equality the central fringe will fill the entire field of view and no fringe will show on the screen. As mirror 23 is moved past the position of path equality (still moving toward the beam splitter) the fringes will begin to reappear at the center and move outwards. Thus, the motion of the fringes is reversed, more and more fringes will become visible as the path difference is increased.

When the mirror 23 is moved a distance d, n fringes will either appear or disappear at the center of the pattern, or pass a given point near the center, when n times l is equal to 2d, where l is the wavelength of the laser light. If the mirror 23 is tilted a small angle alpha, the fringe interference pattern will assume the appearance of an extended circle sector with a plurality of adjacent circle segments, that are alternately bright and dark. The dark segments (interference) are sharper and have better definition than the light segments.

Figure 6A:
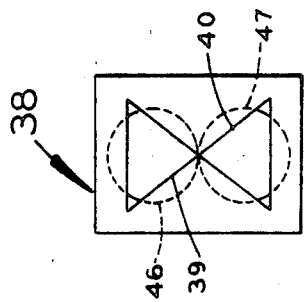
FIG. 6a & 6b is a grammatical detailed view of a photodiode pattern-sensing arrangement using masked photodiodes.
Figure 6B:
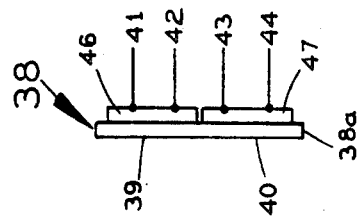

The photodetector 38 is a motion sensing photo device constructed of two photo diodes 46 and 47 disposed one above the other as shown in FIGS. 6a and 6b; the two photo diodes 46,47 are connected by leads 41, 42, 43 and 44 to amplifying apparatus shown in more detail in FIG. 4a.

The motion sensing photo detector 38 is shown in more detail in FIG. 6a which is a face view showing in phantom line circles two photo diodes 46 and 47 partially covered by two opposing equilateral triangular openings 39 and 40, respectively, cut in a mask 38a in front of the faces of the photo diodes 46 and 47.

Each photo diode 46 and 47 has two leads 41,42 and 43,44 respectively connected to an amplifying circuit shown in FIG. 4a.

In FIG. 4a, the two leads 42 and 44 are in common connected to ground while leads 41 and 43 are connected to two amplifiers 36 and 37 respectively. The outputs of the two amplifiers 36 and 37 are in turn connected to the two opposing field windings F1 and F2 respectively of a reversible linear motor 48 having an axial sliding shaft 49. The two opposing field windings F1 and F2 are commonly connected at the center and in turn connected plus voltage. If the two inputs to the two amplifiers 36 and 37 are of equal magnitude, the combined field from the two field windings F1 and F2 will be zero, but if one is higher than the other, the combined field will assume a certain strength that will cause the sliding shaft 39 to move axially in one direction or the other.

Returning now to FIG. 1, the linear motor 48 is shown at the bottom wall of the laser chamber 11, with its axially slidable shaft 49 coupled by means of a linkage consisting of a lever 51 pivotally attached at its distal end at pivot point 52 to the slidable shaft 49 and at its proximal end pivotally attached at pivot point 53 to the upper wall of the laser chamber 11.

The lever 51 is, at an intermediate pivot point 54, pivotally attached to a horizontally slidable fork element 56 having two outer slidable legs 58, slidably received in loosely fitting sleeves 59, rigidly inserted into the interferometer suporting frame 61. A center leg 62 of the fork element 56 supports the vertical mirror 19 and has a horizontal fork handle 57 that is at its distal end pivotally attached at pivot point 62 to a lever arm 63, which is, in turn, at its distal point pivotally attached at pivot point 64 through a sliding arm 65 to a disc 66, which is coupled on the right hand side to a bellows 67 and on its left hand side to a helical compression spring 68, exerting a force indicated by arrow 69 against the disc 66.

The lever arm 63 is, at its proximal end, at pivot 60 attached to the upper wall of the lever chamber 12.

The three chambers housing the device, namely the laser chamber 11, the lever chamber 12 and the bellows chamber 13 are completely evacuated of air. The interior of the bellows 67 is connected to atmospheric air through an airfilter 71 filled with a filter medium 72 through an air opening 73.

It follows that the laser beam, the entire laser interference arrangement, the photo detector 38, with the amplifier 36-37 and the linear motor 48 together constitute a very sensitive feedback servo system that "locks" onto the dark interference fringe 78.

The voltage across the field windings F1, F2 is further connected to the two inputs of a balanced amplifier 74 which produces an output voltage on its output lead 82 which accordingly is proportional to the airpressure in the bellows 67. Such a sensitive airpressure indicator has applications as a flight instrument for indicating altitude and also for indicating rate of climb ("ROC") by introduction of suitable means for translating the output voltage at lead 82, as described in more detail hereinbelow, in connection with FIG. 4a.

It also has the potential to be used as an aircraft speed indicator when connected with a Pitot tube or as an accelerometer when connected with a defined mass through suitable linkage.

It should be understood that mechanical linkages that interconnect the bellows 67 with the mirror 19 and the linear motor 48, and wherein the ambient atmospheric pressure is balanced against the pressure of a strong spring 68 and a lienar motor 48 by means of an interference fringe created on a motionsensing photo detector, can be realized in many other ways than shown and described hereinabove. In particular, since the mechanical movements are extremely small, the entire mechanical linkage can be constructed with that in mind and flexible frictionless joints can be used throughout, instead of pivot joints.

The fork element 56 may be provided with limit screws 101 and 102 that can be adjusted so that the lateral travel of the fork element 56 is confined within a certain axial range so that the instrument, when initially powered up is always started on the same interference fringe.

The air pressure indicator described hereinabove is well suited as a flight altimeter for an aircraft combined with rate-of-climb indicator by means of a suitable electrical circuit for reading the indicator output as it appears across the field windings F1 and F2 of the linear motor 48.

The basic circuit is shown in FIG. 4a and 4b.

In FIG. 4a, the output from the airpressure indicator taken from the field windings F1 and F2 are connected through leads 75 and 76 to the differential amplifier 74 with the output lead 82, having a potential that at all times represents the airpressure in the bellows 67.

The potential at 82 is connected through a resistor R4 to a voltage indicator ALT, 75, which, using a proper scale indicates altitude in chosen units, e.g. feet, or feet multiplied by 100, 1000's or 10000's as selected by the pilot. A scale selector 85 with a dial enables the pilot to select the most suitable scale factor. A potentiometer P1 serves to selectively provide an off-set corresponding to the barometric pressure at the ground level, which the pilot uses to calibrate his altimeter in a manner well known to pilots of aircraft.

A temperature sensing circuit consisting of a thermal sensor 84 is connected through an amplifier 83 and a resistor R5 to the input to the altitude indicator 75. A temperature correction may be necessary in order to overcome temperature dependency of the mechanical linkages of the airpressure indicator shown in FIG. 1.

The resistors R4, R5 and R7 together form a summing circuit that linearly combines the outputs of the amplifier 74, potentiometer P1 and the temperature compensator 83.

The temperature sensor 84 may be any suitable temperature sensing device such as a thermistor, a diode, a thermocouple or any other suitable element. If it is a thermistor or a diode, a resistor R6 connected to plus potential may be required to provide current bias.

FIG. 2 shows an embodiment of the air pressure indicator that is quite similar to that shown in FIG. 1 and wherein similar elements are shown with the same reference numerals.

The difference resides in a different arrangement for indicating lateral movement of the fork element 56. Instead of using a moving interference fringe the laser beam 15 is projected onto the plane mirror 16, and from there as a slanted light beam 88 onto a cylindrical convex curved mirror 87. As the fork element moves laterally a short distance under control of the changing air-pressure in the bellows 67, the slanted light beam 88 will impinge on different points of the curved mirror 87, which will in turn cause the again reflected light beam 89 to be deflected up or down, as shown by the upper dashed line 89' or the lower dashed line 89'', indicating movement of the curved mirror 87 to the right or the left, respectively. The very thin laser beam 15 is shaped by a rectangular horizontal slit 14a at the light emitting aperture of the laser 14, so that the beam has a horizontal rectangular cross-section having a small vertical dimension and will, after being reflected by the curved mirror 87, be dispersed slightly, as shown exaggerated in the Figure and appear on the light sensor 38 as a thin horizontal line of light. The position sensing detector 38 responds to the up-and-down movement of the beam 89 in a manner similar to that described by the interference fringe 78 shown in FIG. 4b, except in this case the sensor responds to a bright line, instead of a dark fringe line. The light sensor 38 is coupled through a circuit similar to that shown in FIG. 4a and "locks" onto the light line of the beam 85 through the linear motor 48. In all other respects the apparatus of FIG. 2 is similar to that of FIG. 1.

Figure 3:
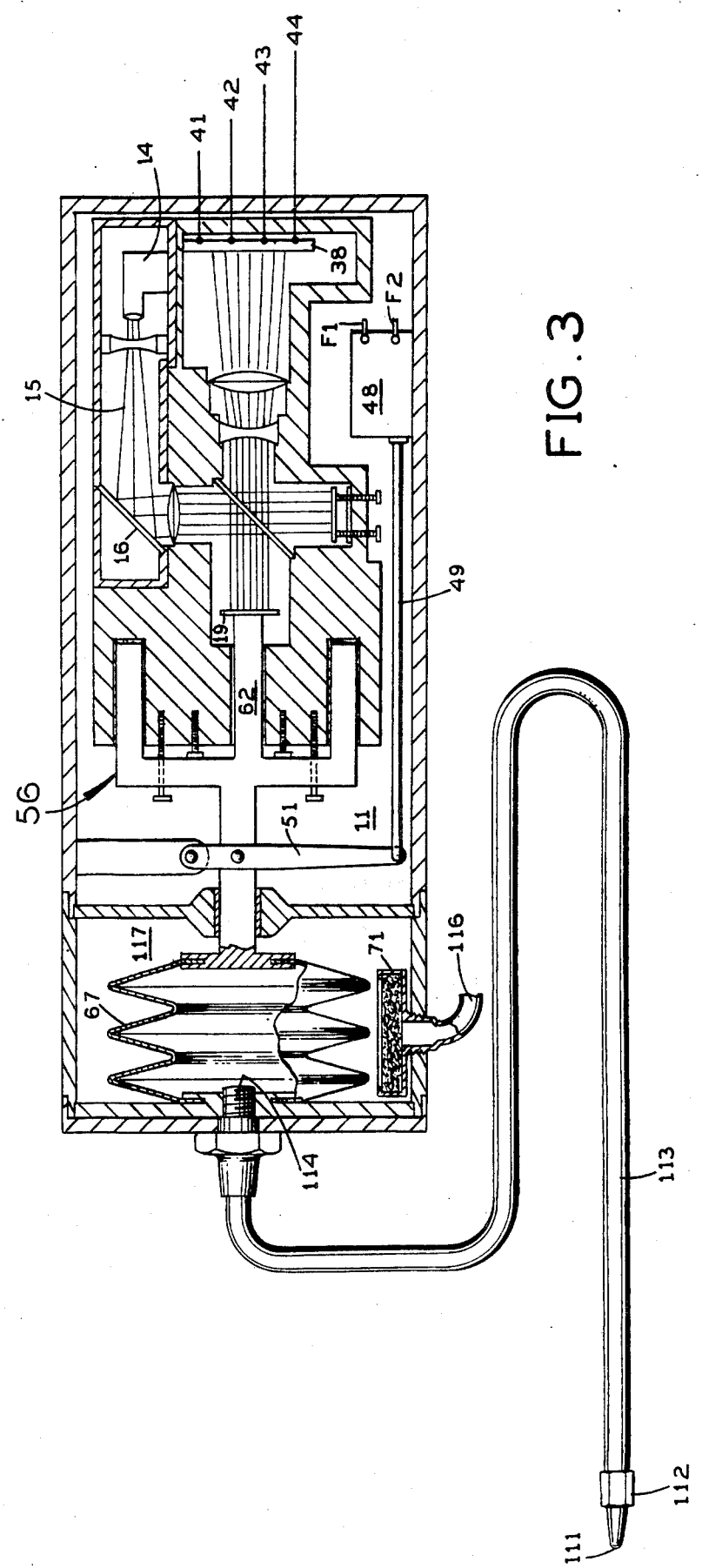
FIG. 3 is a cross-sectional view of the interior of an embodiment of the invention configured as an airspeed indicator showing the fluid connection with a pitot tube.

FIG. 3 shows another embodiment of the pressure sensing apparatus shown in FIG. 1 except the bellows 67 is connected directly to the fork element 56, instead of through the sliding arm 65 and the lever arm 63, as in FIG. 1.

This embodiment of the pressure indicator is especially useful as an airspeed indicator which responds to air pressure at the point 111 of a pitot tube 112 which is connected through a tube 113 and through an opening 114 to the interior of the bellows 67, located in a bellows chamber 117. The bellows chamber in this case is not evacuated but is filled with atmospheric air through an air filter 71 connected to a reference air pressure point on the aircraft fuselage through a tube 116. In this configuration, the bellows responds to the difference in air pressure between the pressure at the point 111 of the Pitot tube 112 and the pressure at the reference point. This difference indicates the speed of the aircraft relative to the air.

In this case the voltage between the leads F1 and F2 of the linear motor 48 is an indication of the airspeed and can be read by the pilot of a properly calibrated voltage indicator connected to leads F1 and F2 in similarity with the altitude indicator 75 shown on FIG. 4a. A similar temperature correcting arrangement may also be provided.

Figure 5:
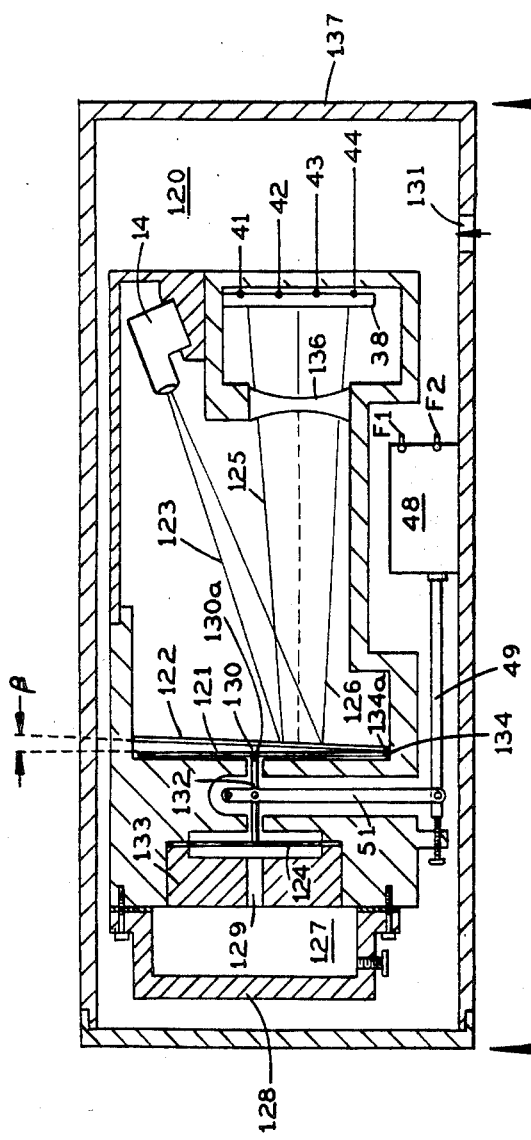
FIG. 5 is an elevational diagrammatic view of the invention configured as an inertia indicator using a reflective air wedge.

FIG. 5 shows a pressure indicator that is based on the vertical movement of light interference fringes created by an airwedge consisting of two glass plates 121 and 122 disposed at a small variable angle beta between the glass plates, so that they form an airspace between them, forming a vertical air wedge assembly 130 with its apex 134 at the bottom horizontal line where the adjoining surfaces of the glass plates 121 and 122 meet. The front mirror 122 is rigidly attached, while the rear mirror 121 is pivotable about the horizontal pivot axis 134a, so that it can pivot in response to the movement of the push rod 132, pivotally attached at pivot point 130a to the mirror 121. The front glass plate 122 may advantageously be half-silvered on the inner surface, facing the other glass plate 121. light beam is projected onto such an air wedge, the reflected light beam between the lines 125 and 126 forms a raster of alternating horizontal dark interference lines and bright bands known as Fizeau fringes. If the mirror 121 is moved a small angle about the pivot axis 134a, the raster of Fizeau fringes moves up or down in direct proportion to the distance of transposition of the air wedge 130. The fringes are projected onto a motion-sensing photo detector 38 that is identical to the photo detector 38 described hereinabove in connection with FIGS. 1 and 2.

For best results, the laser beam 123 is made slightly diverging, as shown somewhat exaggerated in the figure by being transmitted through a narrow horizontal slit (not shown) in the light emitter 14 or by means of a suitable lens. The reflected diverging interference pattern defined by the lines 125 and 126 may advantageously be further expanded in the concave lens 136.

The air wedge mirror 121 is attached to a horizontal pushrod 132, which is in turn attached to the center of a circular elastic diaphragm 124 that encloses a vacuum chamber 127, connected to the left hand side of the diaphragm through a channel 129. The push rod 132 is mechanically linked by a lever 51 and a sliding shaft 49 to a linear motor 48 which includes a solenoid F1, F2 seen in FIG. 4a, and the photo detector is coupled to an amplifier circuit as shown in FIG. 4a, which is also connected in a feedback coupling to the linear motor 48. The chamber 120 surrounds the vacuum chamber 127 and the air pressure in the chamber 120 also impinges upon the right hand side of the elastic diaphragm 124, which therefore in yielding to the air pressure bends inward toward the vacuum chamber a small distance that is proportional to the air pressure in the chamber 120. The diaphragm 124, bending inward, and being coupled by the pushrod 132 to the air wedge assembly causes the air wedge mirror 121 to be moved a small angle that is proportional to the movement of the center of the diaphragm 124. The angular movement of the mirror 121 causes the horizontal interference lines on the photo detector 38 to move up or down in unison with the movement of the center of the diaphragm 124, which is, in turn, responsive to the changes in air pressure in the chamber 120.

In operation, the entire instrument, using the same feedback mechanism described in connection with the embodiments shown in FIGS. 1, 2 and 3 is capable of "locking onto" one off the fringes, and when such locked, translates the air pressure on the elastic diaphragm 124 into a proportional voltage at the output 82 of the differential amplifier 74 of FIG. 4a, which in turn may be presented as altitude on the instrument ALT 75, and which may be translated into rate-of-climb by differentiation as described hereinabove.

Figures 7, 8:
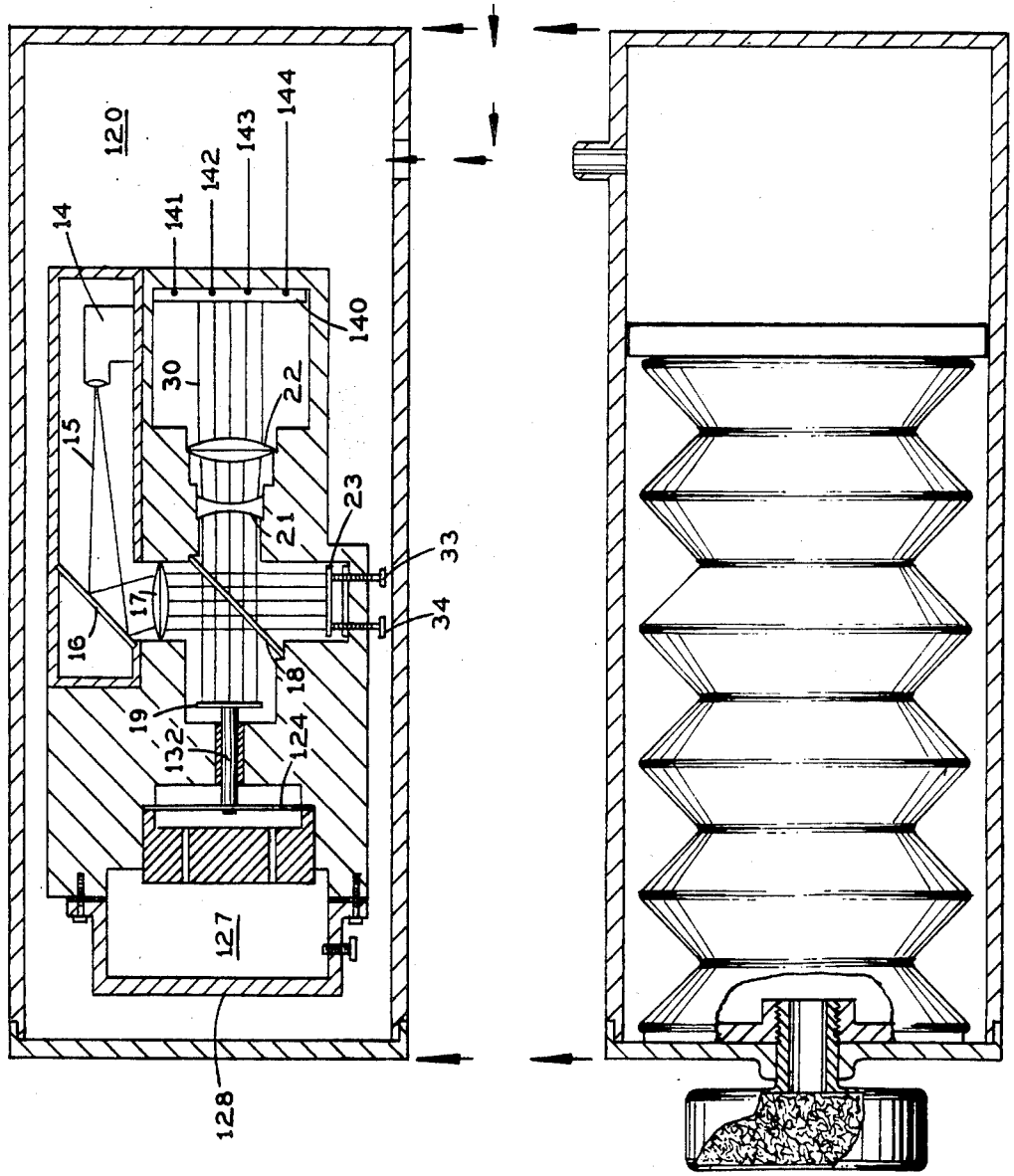
FIG. 7 is a sensitive air pressure indicator having a separate vacuum chamber. The indicator is contemplated as a ground-based barometer.
FIG. 8 is a vent plug for closing the air vent of the instrument according to FIG. 7.

FIG. 7 shows an altimeter using a beam of laser light in a construction that is somewhat similar to that shown in FIG. 5, the main difference being that it does not have the feedback from the linear motor 48 to the mirror 19 and the air wedge assembly 130. In this arrangement of the laser interferometer it is similar to the arrangement of FIG. 1 with a laser 5 projecting a diverging beam 15 onto a mirror 16, and from there downward through the lens 17 onto the half-silvered mirror 18 projecting half of the light onto the mirror 19 and the other half downward onto the adjustable mirror 23 which again reflects the light upward unto the mirror 18 and from there to the right, mixed with the light reflected from the mirror 19 through the two lenses 21, 22 onto a photo detector 140, advantageously intended as ground based air pressure indicator.

In the embodiment shown in FIG. 7, the adjustable mirror 23 is adjusted such that a raster of parallel horizontal interference fringes are created across the face of the photo detector 140. As the air pressure in the chamber 120 changes, the diaphragm 124, which encloses the evacuated chamber 127, flexes and displaces the mirror 19 attached by the pushrod 132 to the diaphragm 124. As the mirror moves back and forth in response to the changing air pressure, the interference fringes across the photo detector 140 move up or down. A certain displacement delta of the mirror 19 causes a certain number of parallel interference fringes 147 shown on FIG. 9a, which shows the photo detector 140 seen from the face side. Two photo diodes 148 and 149 are placed side-by-side instead of one above the other as in FIG. 6a and b. The face of the two photo diodes 148 and 149 are masked such that a bright band travelling downward across the face of the photo detector 148 creates decreasing ramp output signal across terminals 141 and 142 seen in FIG. 9b, trace b, while an increasing ramp output is created by the photo diode 149 seen in FIG. 9b, trace d. Conversely, if the fringe pattern moves upward photo diode 148 produces a rising ramp signal seen in FIG. 9b, trace a, and photo diode 149 produces a falling ramp signal, seen in FIG. 9b, trace c. Using these output signals and electronic circuit as shown in FIGS. 9a–9d, the circuit counts the moving fringes and stores the count in an up-down counter 151, the output of which Q1–Q10 provides a binary digital representation of the displacement delta of the mirror 19 which in turn represents the pressure on the diaphragm 124 and in this way a digital representation of the air pressure in the chamber.

Figure 9A:
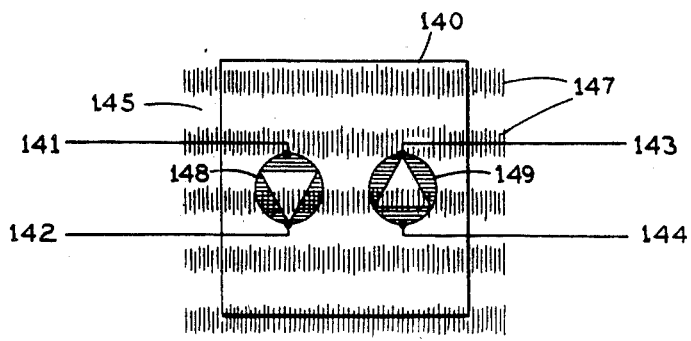
FIG. 9a, 9b, 9c and 9d is a schematic circuit diagram of the circuit for translating the motion of the interference pattern into an electronic digital signal.

The circuit of FIG. 9d operates as follows:

Viewing first FIG. 9a, alternating dark fringes 147 and bright bands 14 are projected across the face of the photo detector 140 which has the two photo diodes 148 and 149 attached thereto, the diodes having pairs of output leads 141, 142 and 143, 144 respectively. The photo diode 148 has its circular active face masked by a mask having an opening consisting of an equilateral triangle pointing downward therein, while the photo diode 149 has a similar mask, but with an upward pointing triangular opening.

Figure 9B:
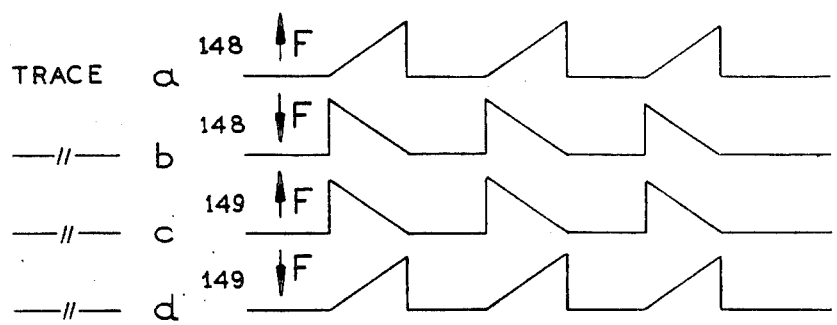
Figure 9C:
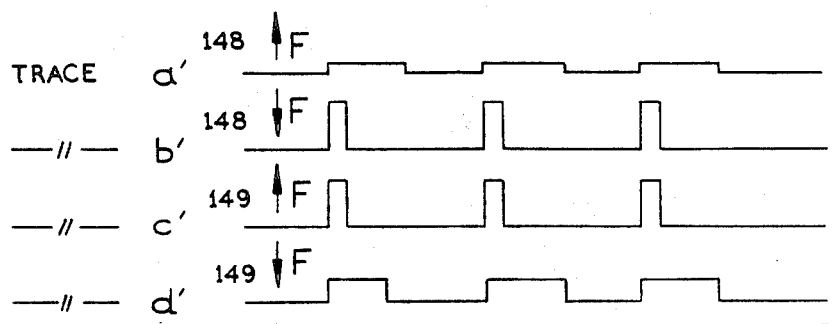

It follows that if a bright band 145 moves downward across the face of the photo detector 140, the diode 148 produces an output signal as shown in FIG. 9b, trace b, while the diode 149 produces a signal shown as trace d.

Conversely, if the bands move upward, the signals will be as shown by traces a and c respectively.

Figure 9D:
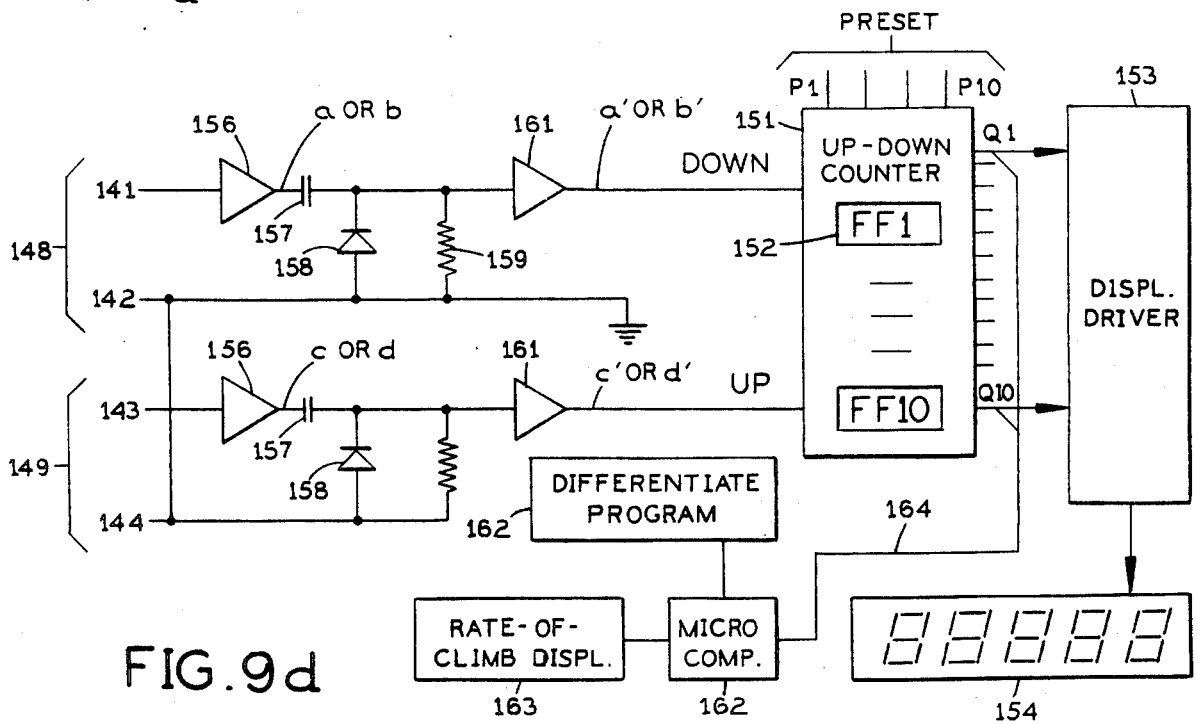

Two differentiating circuits are shown in FIG. 9d each consisting of an input amplifier 156, a differentiating capacitor 157, a diode 158, a resistor 159 and an output threshold amplifier 161. The upper amplifier 161 operates to produce a pulse for each bright band moving downward across the photo detectors at the output of the upper amplifier 161 and at the output of the lower amplifier produces pulses 161 when the fringes are moving upward. The outputs from the amplifiers 161 are shown in the traces a'–d' of which trace b' shows the pulses from the upper amplifier 161 when the fringes are moving downward and trace c' shows the pulses of the lower amplifier 161 when the fringes move upward.

An up-down counter 151 is a conventional well known counting device made by several manufacturers, such as Motorola and Texas Instruments Corporation. The up-down counter 151 contains a number, e.g. ten, counting flip-flops 152 and can be preset to any desired count from an external circuit not shown via preset leads P1–P10. The up-down counter maintains a continuous count of all up and down pulses received. The instant count can be displayed on a visual digital readout 154 via a display driver circuit 153.

Instead of an electronic circuit, the output could be displayed by an electromechanical arrangement wherein the updown pulse drives a small stepping motor of well known construction, which, in turn, via a suitable gear train presents the count total on a dial with hands, in well known manner.

Figure 10:
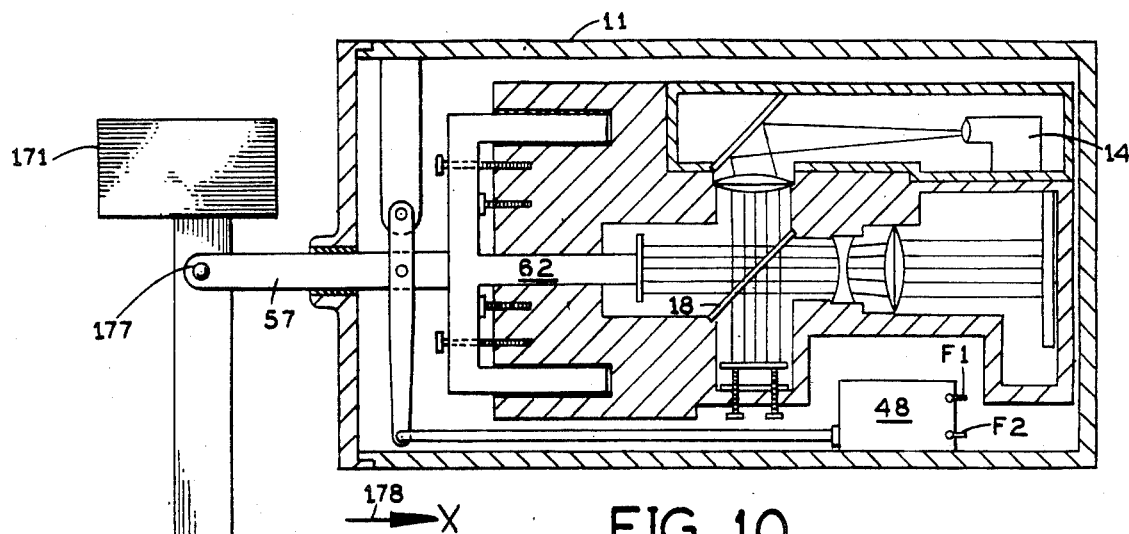
FIG. 10 is a diagrammatic view of the invention configured as an accelerometer.

FIG. 10 is another application, namely an accelerometer, of the laser interferometer described in connection with FIG. 1, in particular, as the laser chamber 11 and having all the same components of which some of the major components are shown with the same reference numerals.

Figure 11:
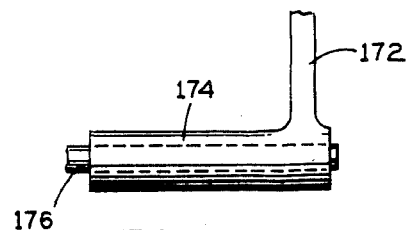
FIG. 11 is a fragmentary detail view of the mass arm pivot point shown in FIG. 10.

The accelerometer has a mass m, 171, disposed at the distal end of mass arm 172 that is pivotable in a single plane about the pivot pin 176 received in a proximal L-piece 174, best seen in FIG. 11.

The mass-arm 172 is connected, at pivot point 177 to the push rod 57 which engages the interferometer 11 as described in detail hereinabove. If the accelerometer is moving to the right as shown by the arrow 178 in the direction x at a constant velocity v which is equal to $$v = dx/dt \tag{5}$$

there will be no force acting on the mass m. If, however, the velocity v is changing, there will be a force f acting on the mass m according to the equation $$f = m(dv/dt) \tag{6}$$

which combined with equation (5) above gives $$f = m(d^2x/dt^2) \tag{7}$$

The force f is translated to a proportional voltage appearing across the terminals F1 and F2 of the linear motor as also described in detail hereinabove.

Figure 12:
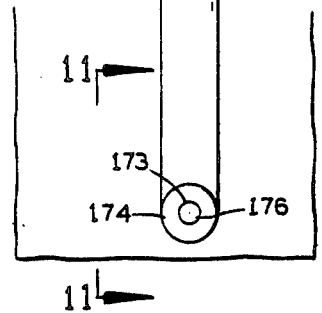
FIG. 12 is three axis accelerometer.
Figure 12:
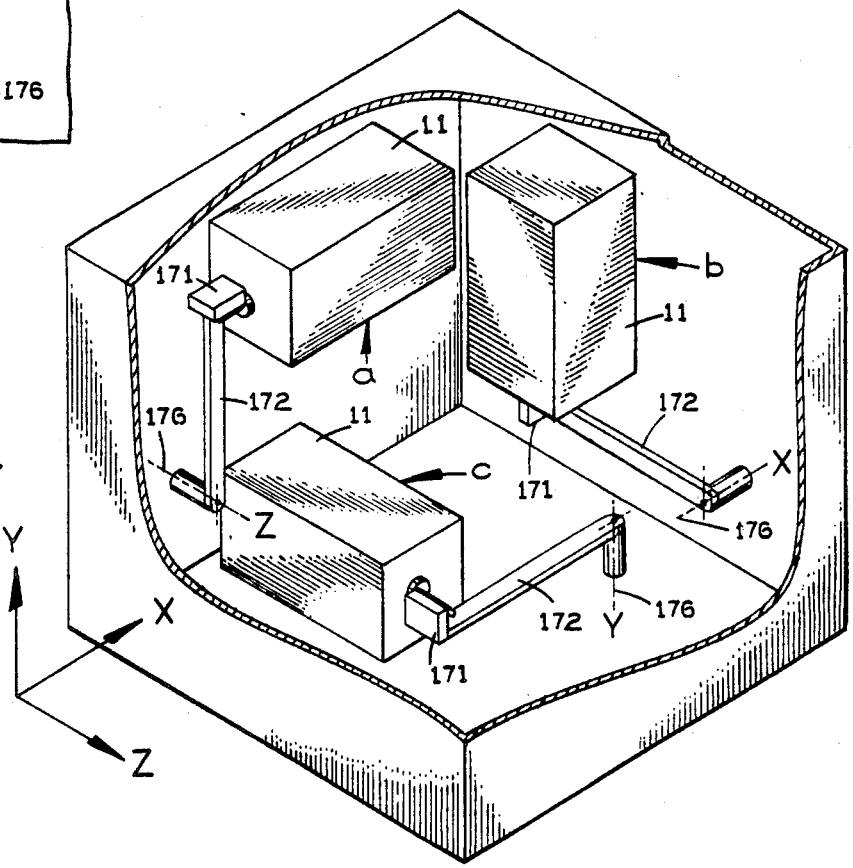

FIG. 12 shows a three-axis accelerometer having masses 171 pivoting about orthogonal axes 176, in accordance with the coordinates x, y and z.

I claim:

1. Accelerometer comprising:
at least one mass producing an acceleration force when accelerated;
a laser generating a laser light beam;
a light interferometer for receiving said light beam and creating a movable interference pattern and having a plurality of mirrors for reflecting said light beam;
a motion sensing photo detector for receiving said interference pattern and producing motion-responsive output in response to the movement of said interference pattern;
amplifying means connected to said motion-sensing detector for increasing the output from said motion-sensing detector and having amplified output;
a linear motor connected to said amplified output for producing an output force that is proportional to said amplified output;
first linkage means connecting said mass with a first one of said plurality of mirrors for producing a movement of said interference pattern in a first direction;
second linkage means connecting said linear motor to said first linkage means for moving said interference pattern in the opposite direction of said first direction; and an acceleration display showing the degree of acceleration in acceleration units.

2. Accelerometer according to claim 1 comprising three masses disposed within respective planes each at ninety degree angles relative the other two planes.

3. Accelerometer according to claim 1 wherein said linear motor includes two opposing field windings connected to said amplified output for producing a motor output force proportional with said amplified output.

4. Accelerometer according to claim 1 wherein said amplifying means include a first and a second amplifier, each having an input and an output; said motion-sensing photo detector includes first and second coordinated photo diodes, each having a center and a first and a second mask covering said first and second diode respectively, said diode centers being disposed one above the other on a vertical line, said first mask having a triangular aperture having a downward facing point and said second mask having an upward facing point, said upward and downward facing points touching one another at a center line perpendicular to a line defined by said diode centers, and wherein said first and second diode each has an output connected to respective inputs of said amplifiers.

5. Accelerometer according to claim 1 wherein said plurality of mirrors include a reflecting air wedge having a reflecting, angularly movable mirror of the air wedge for producing said interference pattern.

* * * * *